March 11, 1958  G. F. HOEPER  2,826,425
COLLAPSIBLE TRAILER
Filed July 26, 1955
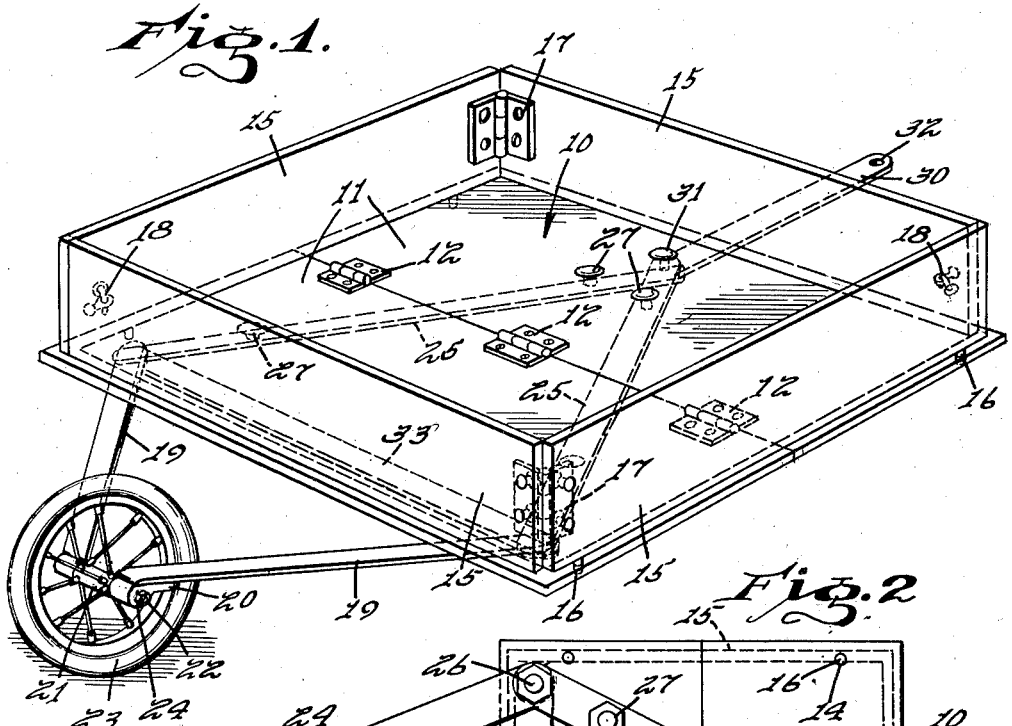
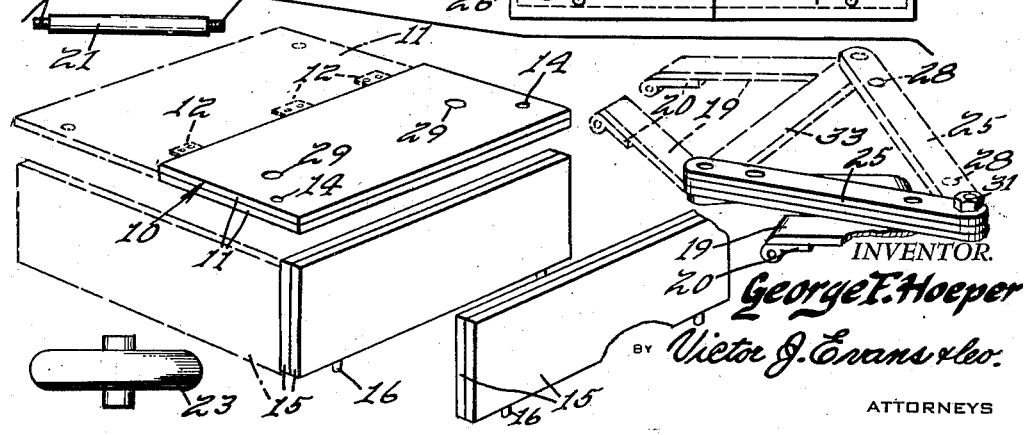
INVENTOR.
George F. Hoeper
BY Victor J. Evans & Co.
ATTORNEYS

United States Patent Office 2,826,425
Patented Mar. 11, 1958

2,826,425

COLLAPSIBLE TRAILER

George F. Hoeper, Beloit, Wis.

Application July 26, 1955, Serial No. 524,350

2 Claims. (Cl. 280—36)

This invention relates to a mobile trailer, and more particularly to a mobile trailer which can be collapsed or folded when not being used.

The object of the invention is to provide a trailer which may be towed behind a vehicle when in use, and wherein the trailer can be folded or collapsed to occupy a minimum amount of space when not being used.

Another object of the invention is to provide a collapsible trailer which includes a base having a pair of sections that are hingedly connected together, there being vertically disposed walls which are releasably connected to the base, and braces detachably connected to the trailer for supporting a ground engaging wheel.

A further object of the invention is to provide a collapsible trailer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view showing the trailer in extended position ready for use.

Figure 2 is a bottom plan view of the trailer.

Figure 3 is an exploded view showing the various parts of the trailer disassembled and collapsed ready to be stored when not being used.

Referring in detail to the drawings, the numeral 10 designates a horizontally disposed base which may have a rectangular shape, and the base or bed 10 includes a pair of rectangular sections 11 that are hingedly connected together at their meeting edges by means of a plurality of hinges 12, Figure 1. When the trailer is being used the pair of sections 11 are arranged in coplanar or aligned relation, and when the trailer is not being used the parts are disassembled and the sections 11 are in folded or superposed relation as shown in Figure 3. The sections 11 of the base are provided with a plurality of apertures 14 for a purpose to be later described, and the apertures 14 are arranged adjacent the outer edges of the base.

The trailer further includes a plurality of walls 15 of rectangular shape, and the walls 15 are arranged in a vertical plane when the trailer is being used. Thus, the walls 15 when arranged as shown in Figure 1 form an enclosure whereby any desired article can be retained in and conveyed by the trailer.

An interengaging means is provided for detachably connecting the walls 15 to the base 10, and this interengaging means comprises a plurality of pins or pegs 16 which depend from the lower edges of the walls 15 and are secured thereto. The pins 16 are snugly seated or received in the apertures 14 in the bed 10. Thus, the walls 15 are maintained in their proper assembled relation when the trailer is being used. However, the pins 16 can be readily moved out of engagement with the apertures 14 when the trailer is to be disassembled or collapsed. The walls 15 are arranged in pairs and there are two pairs of the walls. The walls of each pair are hingedly connected together by means of hinges 17, and the pairs of walls are connected together by means of latches 18. Thus, with the parts arranged as shown in Figure 1 the latches 18 help to retain the walls in their proper position. However, when the trailer is to be collapsed or folded, the latches 18 are disengaged, and then the walls 15 of each pair are folded to a superposed position as shown in Figure 3 so that they occupy a minimum amount of space for storage or shipment.

Extending from the trailer is a pair of angularly arranged braces 19 which each have a bracket 20 secured to their outer end. An axle 21 is supported by the pair of brackets 20, and the axle 21 includes reduced diameter end portions 22 which may be threaded exteriorly. A ground engaging wheel 23 is journaled on the axle 21, and suitable securing elements such as nuts 24 may be arranged in threaded engagement with the ends 22 for maintaining the wheel and axle in their proper assembled position.

Positioned below the bed 10 and detachably connected thereto is a pair of angularly arranged arms 25. The arms 25 are connected to the inner ends of the braces 19 by suitable securing elements such as bolt and nut assemblies 26. The arms 25 are also detachably connected to the base or bed 10 by suitable bolt and nut assemblies 27 which extend through openings 28 in the arms 25, and the bolt and nut assemblies 27 also extend through openings 29 in the sections 11 of the base 10.

A means is provided for connecting the trailer to a towing vehicle such as an automobile, and this means comprises a tongue 30 which may be detachably connected to the arms 25 by a bolt and nut assembly 31. The front end of the tongue 30 may be provided with an opening 32 whereby a suitable clevis or hitch pin can be arranged in engagement therewith. A crosspiece 33 interconnects the inner ends of the braces 19 together so as to help strengthen or reinforce these members.

From the foregoing it is apparent that there has been provided a trailer which will retain or maintain the position shown in Figure 1 when being used. Thus, the tongue 30 can be connected to a towing vehicle such as an automobile, and then articles to be transported or carried can be conveniently stored in the space between the walls 15. The wheel 23 supports the rear of the trailer. Then, when the trailer is not being used it can be readily disassembled so that it will occupy a minimum amount of space whereby it can be readily carried from place to place. Thus, to disassemble the trailer the latches 18 are disconnected, and then the pins 16 are disengaged from the apertures 14 so that the walls 15 can be folded together. Then, the sections 11 of the base 10 are folded to the position shown in Figure 3 and the braces 19 and arms 25 are disconnected by removing the bolt and nut assemblies. The nuts 24 can also be removed from the ends of the axle 21 so that the wheel 23 can be removed. This entire disassembly operation can be accomplished with very little effort and in a minimum of time. The braces and arms can be folded to also occupy a small amount of space when they are not being used.

I claim:

1. In a foldable trailer, a rectangular base including a pair of sections hingedly connected together at their meeting edges, there being a plurality of apertures in said sections adjacent their outer edges, a first pair of vertically disposed walls hingedly connected together and adapted to be arranged at right angles with respect to each other, a second pair of vertically disposed walls hingedly connected together, latches detachably connecting the walls of said first pair to the walls of said second pair, a plurality of vertically disposed pegs depending from the lower edges of said walls and snugly seated in the apertures in said base, a pair of braces arranged angularly with respect to each other and extending from said base, a bracket secured to the front end of each of said braces, an axle journaled between said pair of brackets, a wheel mounted on said axle, a pair of angularly arranged arms positioned below said base and connected to the ends of said braces, securing elements detachably connecting said arms to said base, and a tongue extending from said arm and adapted to be connected to a towing vehicle.

2. A foldable trailer comprising a rectangular horizontally disposed base embodying a pair of rectangular sections hingedly connected together at their meeting edges, there being a plurality of apertures in said sections adjacent their outer edges, a first pair of vertically disposed walls of rectangular shape hingedly connected together and adapted to be arranged at right angles with respect to each other, a second pair of vertically disposed rectangular walls hingedly connected together, latches detachably connecting the walls of said first pair to the walls of said second pair whereby when the trailer is to be collapsed or folded, the latches are disengaged and then the walls of each pair are folded to a superposed position, a plurality of vertically disposed pegs depending from the lower edges of said walls and snugly seated in the apertures in said base, said pegs adapted to be moved out of engagement with the apertures when the trailer is to be disassembled or collapsed, a pair of braces arranged angularly with respect to each other and extending from said base, a bracket secured to the front end of each of said braces, an axle journaled between said pair of brackets, a wheel mounted on said axle, a pair of angularly arranged arms positioned below said base and connected to the ends of said braces, securing elements detachably connecting said arms to said base, a tongue extending from said arms and adapted to be connected to a towing vehicle, the front end of the tongue being provided with an opening whereby a suitable clevis or hitch pin can be arranged in engagement therewith, and a cross piece interconnecting the inner ends of the braces together for reinforcing the braces.

References Cited in the file of this patent

UNITED STATES PATENTS

| | | |
|---|---|---|
| 1,038,247 | Weitzel | Sept. 10, 1912 |
| 1,820,466 | Lieblein | Aug. 25, 1931 |
| 2,072,383 | Rottman | Mar. 2, 1937 |
| 2,169,076 | Barton | Aug. 8, 1939 |
| 2,422,331 | Bates | June 17, 1947 |
| 2,456,013 | Nelson | Dec. 14, 1948 |
| 2,691,546 | Torrance | Oct. 12, 1954 |

FOREIGN PATENTS

| | | |
|---|---|---|
| 794,900 | France | Dec. 26, 1935 |
| 1,000,721 | France | Feb. 15, 1952 |
| 801,555 | Germany | Jan. 11, 1951 |